Dec. 15, 1953     T. L. FAWICK     2,662,625
ASSEMBLY FOR CLUTCHES AND BRAKES

Filed June 14, 1951     3 Sheets-Sheet 1

INVENTOR.
THOMAS L. FAWICK
BY Willard D. Eakin
ATTORNEY

Dec. 15, 1953 T. L. FAWICK 2,662,625
ASSEMBLY FOR CLUTCHES AND BRAKES
Filed June 14, 1951 3 Sheets-Sheet 2

INVENTOR.
THOMAS L. FAWICK
BY Willard D. Eakin
ATTORNEY

Patented Dec. 15, 1953

2,662,625

UNITED STATES PATENT OFFICE 2,662,625

ASSEMBLY FOR CLUTCHES AND BRAKES

Thomas L. Fawick, Cleveland, Ohio, assignor, by mesne assignments, to Federal Fawick Corporation, a corporation of Michigan Application June 14, 1951, Serial No. 231,459

4 Claims. (Cl. 192—88)

This invention relates to assemblies suitable for use as driving clutches or as brakes of the type in which a fluid distensible member comprising material such as rubber is mounted upon a rotary structure and is distended by increase of internal fluid pressure for frictional, torque-sustaining engagement with a member in relation to which it is relatively rotatable.

Its chief objects are to provide against damaging effects of heat developed in the operation of such assemblies, which is inclusive of the heat of internal friction of the material of the fluid-distensible member, especially in the case of a clutch connecting shafts that are not perfectly aligned; the frictional heat of the relatively moving frictionally engaged surfaces; and the heat of sparks that are sometimes created by the relative movement of those surfaces and have sometimes come into burning contact with the fluid-distensible member.

Figure 2:
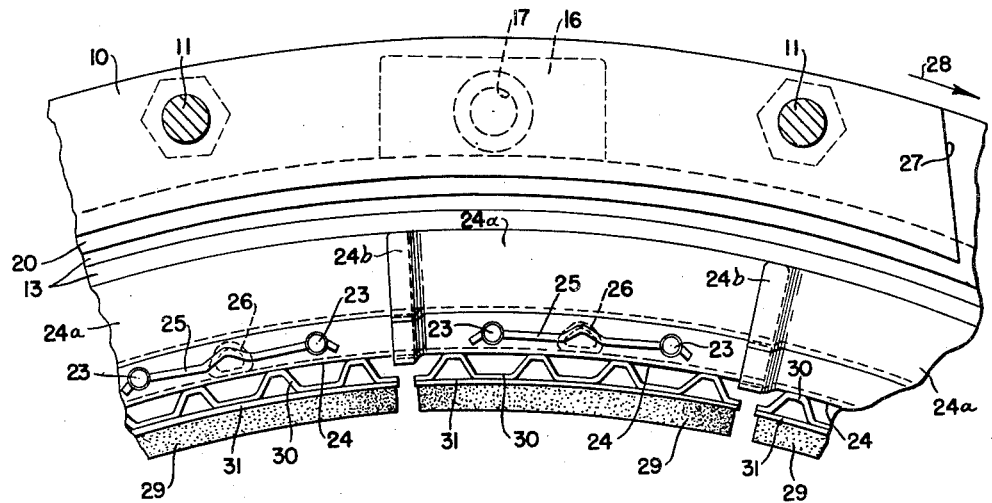
Fig. 2 is a section on line 2—2 of Fig. 1.
Figure 3:
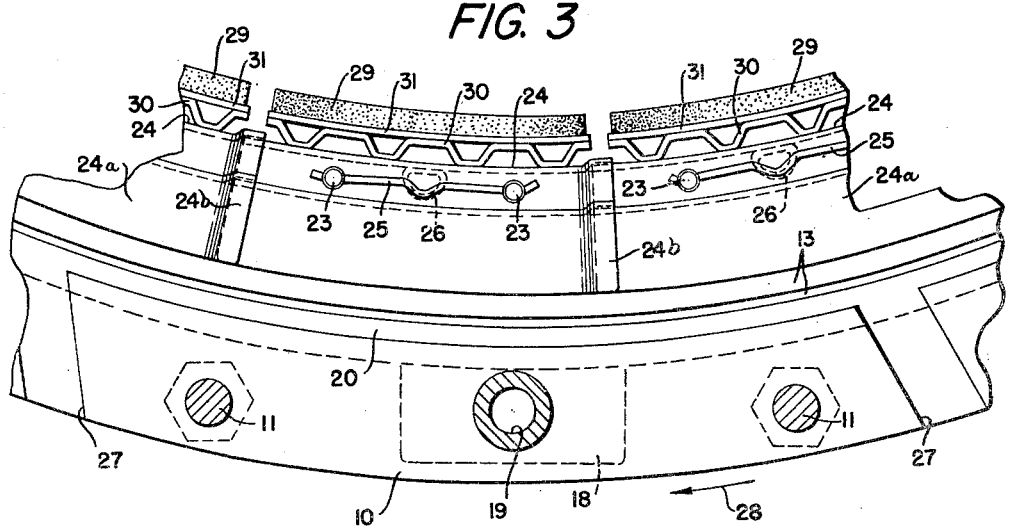
Fig. 3 is a section on line 3—3 of Fig. 1.

The drawings show a dual construction (not a matter of the present invention) in which two metal rings 10, 10 of like construction are secured to each other by bolts 11, 11 (Figs. 2 and 3) and as a unit are secured to a driving member such as a clutch spacer 12 by suitable bolts (not shown).

Vulcanized to the inner face of each of the rings is a fluid-distensible, inwardly-distending or constriction type, annular bag 13, these bags being individually distensible by fluid pressure for selective engagement with one or the other of two clutch drums 14, 15, mounted, for example, upon respective shafts of a reversing gear (not shown).

Figure 1:
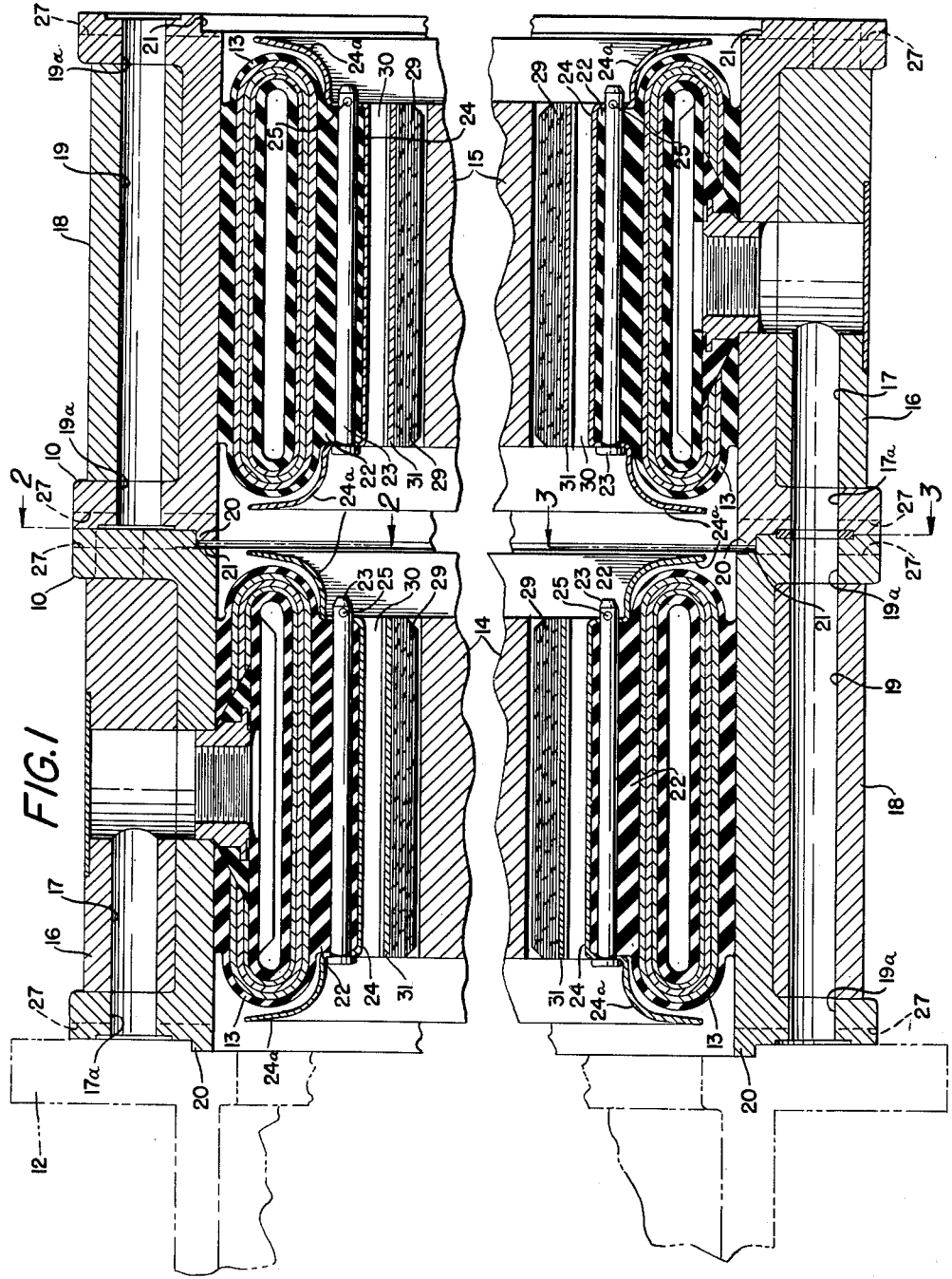
Fig. 1 is a vertically foreshortened axial section of the pertinent parts of an assembly embodying the invention in its preferred form, parts being broken away.

Each of the rings 10, of outwardly open channel form, has mounted in and sealed to the walls of its channel, at diametrically opposite positions, a block 16 formed with a fluid passage 17, registered with a hole 17ª through one of the ring's flanges and adapted to be connected to a suitable fluid-supplying means (not shown) and leading to its own fluid-distensible bag 13; and with a block 18 formed with a fluid passage 19 which is registered with holes 19ª, 19ª through the ring's flanges and therewith providing a passage adapted to conduct pressure fluid through its ring, from a suitable source, to the passage 17 of the other ring, as in the lower part of Fig. 1.

Each of the rings 10 has a centering flange 20 at one side and a centering groove 21 at its other side. This, and the arrangement of the fluid passages 17 and 19, makes the rings, with their bag assemblies on them, interchangeable, this being for convenience and economy of construction and assembly.

The present invention has to do with the wear-shoe assemblies that are mounted upon the bags 13.

Each of the bags is formed with a thick rubber "tread" portion 22 on its inner periphery which is formed with a set of axially disposed through holes for a set of shoe-anchoring pins 23, 23 for holding in place a set of wear-shoe base-plates 24, 24, as described and claimed in my U. S. Patent No. 2,251,445.

Each base plate 24 is of outwardly open U shape in cross-section, is mounted in straddling relation on the tread portion 22 of the bag. Its side flanges are formed with holes for the pins 23, of which there are two for each wear-shoe (Fig. 2), and each pair of pins is held in place by a wire 25 extending through holes in the two pins and having its ends bent to retain it. Each base plate 24 has welded to the floor of its channel a transverse lug 26 fitting in a complemental groove molded in the rubber tread of the bag, to assist the pins 23 in resisting sliding of the shoe on the bag by the torque.

The novelty in this part of the construction is that each side flange of the base plate 24 is extended in a curved portion 24ª extending out and along the side bulge of the bag to protect the latter from any sparks that may be cast off by the wear shoes and impelled against the bag or that may be drawn outward by the centrifugal blower effect, hereinafter described, which I provide for passing cooling air past the wear-shoe assembly and the bag.

Each of the channel-shaped members 24—24ª is formed at one end with a marginal portion 24ᵇ which is off-set outwardly from the channel to overlap the adjacent end of the next one to it of the members 24—24ª, so that the bag is given uninterrupted protection throughout its circumference even through the protective members have movement with relation to one another, circumferentially of the assembly in the distension and retraction of the bag.

The centrifugal blower effect above mentioned is provided by forming each side face of each of the bag-carrying rings 10 with a set of vent grooves 27, 27 extending from the inner peripheral face to the outer peripheral face of the ring, for venting of air urged outward by centrifugal force as an incident of rotation of the ring, bag and associated parts. Preferably the grooves 27 are disposed obliquely with relation to the radius of the assembly, and at an angle to the radius of the assembly, and at an angle to the radius, with respect to the direction of rotation, indicated by the arrows 28, 28 in Figs. 2 and 3, that additional blower effect will be provided by outward crowding or reflecting of the air by the rear wall of the groove.

Figure 4:
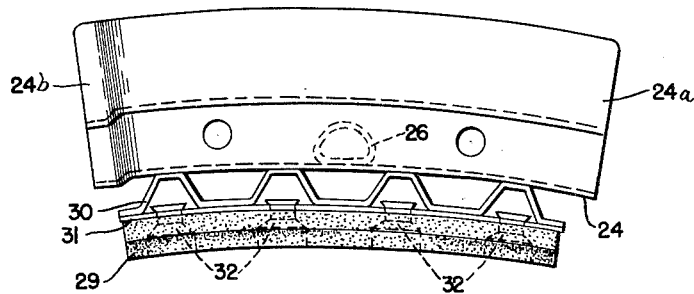
Fig. 4 is an elevation of one of the wear-shoe assemblies that are mounted on the fluid-distensible member.
Figure 5:
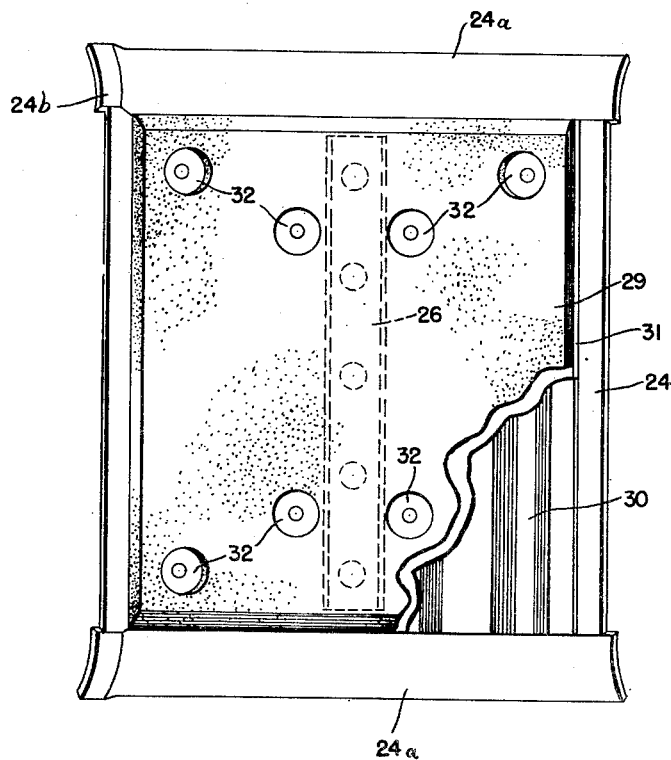
Fig. 5 is a face view of the same, in which the face presented is the lower, radially-inner, face of the assembly as viewed in Fig. 4.

Another feature of novelty having relation to the protective flanges 24ª and the venting grooves 27 is that channels are provided for the axial passing of air between each base plate 24 and its wear shoe, 29, by interposing open-work spacer means, such as a corrugated stamping 30 between the base plate 24 and a facing plate, or immediate base plate 31, to which the wear shoe 29 is secured, as by rivets 32, 32, Figs. 4 and 5. The corrugated spacer and ventilation plate 30 preferably is secured to its embracing members 24, 31 by welding.

Both sides of each ring 10 are formed with the venting grooves 27, so that the rings 10 will be interchangeable, and the grooves can be so positioned that when two of the rings 10 are brought together in a dual structure, as shown in Fig. 1, the grooves on the axially inner side of one ring are in registry respectively with those of the other ring, thus providing vent apertures of double width.

In either a single-ring clutch or a two-ring clutch, however, there is such turbulence of air in the vicinity of the corrugated ventilating spacers 30, and such unbalance of the centrifugal blower effects at the axially opposite sides of the assembly that substantial axial movement of air in or through the spaces provided by the members 30 is effected, for ventilating and cooling the wear shoes and the bag, and for preventing accumulation of burnable dust.

It is believed that the mode of operation is fully brought out in the foregoing description.

Modifications are possible without sacrifice of all of the advantages set out in the foregoing statement of objects and without departure from the scope of the appended claims.

I claim:

1. A structure of the character described comprising two relatively rotatable structures adapted for frictional engagement with each other, one of said structures comprising a torque-sustaining, fluid-distensible bag for effecting the frictional engagement by being distended, a mounting for said bag, and a set of wear-shoe assemblies individually mounted on said bag and having connection one to another only through said bag, the mounting for the bag being formed with passages for escape of air urged outward by centrifugal force incident to rotation of at least one of said structures and each of the wear-shoe assemblies being formed with a ventilating passage for flow of air between the wear shoe and the bag, the structure including spark-deflecting means spaced from but extending along a side of the bag for protection of the bag from sparks created by the wear shoes.

2. A structure as defined in claim 1 in which each wear-shoe assembly comprises a block of frictional material and a base structure to which the said block is secured, and the spark-deflecting means is a part of the said base structure.

3. A structure of the character described comprising two relatively rotatable structures adapted for frictional engagement with each other, one of said structures comprising a torque-sustaining, fluid-distensible bag for effecting the frictional engagement by being distended, a mounting for said bag, and a torque-sustaining, set of wear-shoe assemblies individually mounted on said bag and having connection one to another only through said bag, the mounting for the bag being formed with passages for escape of air urged outward by centrifugal force incident to rotation of at least one of said structures, the structure including spark-deflecting means spaced from but extending along a side of the bag for protecting the bag from sparks created by the wear shoe assemblies.

4. A structure of the character described comprising two relatively rotatable structures adapted for frictional engagement with each other, one of said structures comprising a torque sustaining, fluid-distensible bag for effecting the frictional engagement by being distended, a mounting for said bag, and a set of wear-shoe assemblies individually mounted on said bag and having connection one to another only through said bag, each wear-shoe assembly comprising a block of frictional material and a base structure to which said block is secured, and spark-deflecting means constituting a part of said base structure and extending along but spaced from a side of the bag for protecting the bag from sparks created by the said block.

THOMAS L. FAWICK.

References Cited in the file of this patent

UNITED STATES PATENTS

| Number | Name | Date |
|---|---|---|
| 1,768,183 | Wine | June 24, 1930 |
| 1,983,751 | Goodyear et al. | Dec. 11, 1934 |
| 2,237,164 | Rosenberg | Apr. 1, 1941 |
| 2,246,979 | Kraft et al. | June 24, 1941 |
| 2,251,444 | Fawick | Aug. 5, 1941 |
| 2,251,445 | Fawick | Aug. 5, 1941 |
| 2,311,113 | Klocke | Feb. 16, 1943 |
| 2,392,225 | Butler | Jan. 1, 1946 |
| 2,425,116 | Musselman | Aug. 5, 1947 |
| 2,428,933 | Fawick | Oct. 14, 1947 |
| 2,457,344 | Butler | Dec. 28, 1948 |